United States Patent
Fujii

(10) Patent No.: US 7,642,869 B2
(45) Date of Patent: Jan. 5, 2010

(54) CLOCK GENERATOR

(75) Inventor: Hiroshi Fujii, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 77 days.

(21) Appl. No.: 11/822,749

(22) Filed: Jul. 10, 2007

(65) Prior Publication Data

US 2008/0018374 A1    Jan. 24, 2008

(30) Foreign Application Priority Data

Jul. 24, 2006   (JP)   ............... 2006-201049

(51) Int. Cl.
*H03K 3/03*   (2006.01)
(52) U.S. Cl. ............... 331/57; 331/14; 331/1 A; 331/176; 327/291
(58) Field of Classification Search ............... 327/291; 331/16, 18, 34, 57, 175, 176, 177 R
See application file for complete search history.

(56) References Cited

U.S. PATENT DOCUMENTS 6,734,738 B2   5/2004   Ichimaru

2006/0022764 A1*   2/2006   Partridge et al. ........ 331/177 R
2008/0007362 A1*   1/2008   Partridge et al. ............ 331/176

FOREIGN PATENT DOCUMENTS

| JP | A-61-105629 | 5/1986 |
|---|---|---|
| JP | A-7-30388 | 1/1995 |
| JP | A-2006-215618 | 8/2006 |

* cited by examiner

*Primary Examiner*—Joseph Chang
*Assistant Examiner*—Jeffrey Shin
(74) *Attorney, Agent, or Firm*—Posz Law Group, PLC

(57) ABSTRACT

A clock generator includes a ring oscillator for outputting a basic signal, a divide-by-N frequency divider for dividing the basic signal by a division ratio N to generate a clock signal having a target frequency, a divide-by-two frequency divider for dividing the clock signal by two when an enable signal is on, a counter for counting the number of pulses of the basic signal for a predetermined period of time, a calculator for calculating the division ratio N, and a comparator for comparing a count value of the counter with a threshold value. When the count value of the counter is less than the threshold value, the comparator turns on the enable signal. Thus, when a temperature of the ring oscillator increases, the frequency of the clock signal is reduced to half the target frequency.

17 Claims, 4 Drawing Sheets

CLOCK GENERATOR

CROSS REFERENCE TO RELATED APPLICATION

This application is based on and incorporates herein by reference Japanese Patent Application No. 2006-201049 filed on Jul. 24, 2006.

FIELD OF THE INVENTION

The present invention relates to a clock generator for generating a clock signal.

BACKGROUND OF THE INVENTION

As disclosed in, for example, JP-A-7-30388, a clock generator has been proposed that generates a periodic clock signal by using a ring oscillator. The ring oscillator includes an odd number of inverter circuits (i.e., NOT gates) connected in a circular chain. The output of each inverter oscillates between two voltage levels, representing high and low. Thus, the ring oscillator creates a pulse signal. The clock generator generates the periodic clock signal by dividing the pulse signal by a predetermined frequency division ratio.

A frequency of the pulse signal created by the ring oscillator varies with temperature. The clock generator continuously calculates the frequency division ratio based on the frequency of the pulse signal to keep a frequency of the clock signal constant. This type of clock generator has been widely used in various fields, because the cost of the ring oscillator is low, and the size of the ring oscillator is small.

However, a guaranteed operating temperature of the ring oscillator is relatively low. Therefore, the ring oscillator may be thermally broken, when repeatedly operated and consequently temperature of the ring oscillator is increased. Some kind of method to limit an increase in temperature of the ring oscillator is required, when the ring oscillator is operated in such a manner that the temperature of the ring oscillator is increased.

For example, in a case where the clock generator and a central processing unit (CPU) supplied with the clock signal from the clock generator are packaged in a single chip, heat produced by the CPU is transferred to the ring oscillator in the clock generator. Further, since the generated clock signal also produces heat, the temperature of the ring oscillator may exceed its guaranteed operating temperature. Therefore, the ring oscillator needs to be cooled.

One method to cool the ring oscillator is to add a cooling fan to the clock generator. However, the addition of the cooling fan to the clock generator increases the size and manufacturing cost of the clock generator.

Another method to cool the ring oscillator is to temporary reduce the frequency of the clock signal supplied to the CPU. When the frequency of the clock signal is reduced, the CPU operates at a lower processing speed so that the heat produced by the CPU is reduced. Accordingly, the heat produced by the generated clock signal is also reduced. Thus, the ring oscillator can be cooled by temporary reducing the frequency of the clock signal supplied to the CPU.

It is preferable that a reduction in the processing speed of the CPU should be minimized. Therefore, it is required to efficiently reduce the frequency of the clock signal. The frequency of the clock signal may be efficiently reduced by using a temperature sensor for detecting the temperature of the ring oscillator. However, an addition of the temperature sensor to the clock generator increases the size and manufacturing cost of the clock generator.

SUMMARY OF THE INVENTION

In view of the above-described problem, it is an object of the present invention to provide a clock generator for generating a clock signal by using a ring oscillator, the clock generator detecting a temperature of the ring oscillator without a temperature sensor and changing a frequency of the clock signal based on the detected temperature to prevent the ring oscillator from overheating.

A clock generator includes a ring oscillator, a frequency divider circuit, a counter circuit, calculation means, selection means, and setting means.

The ring oscillator includes an odd number of inverter gates connected in a circular chain and outputs a basic signal from one of the inverter gates. A first division ratio or a second division ratio is set to the frequency divider circuit, and the frequency divider circuit divides the basic signal by the set frequency division ratio. When the first division ratio is set to the frequency divider circuit, the frequency divider circuit divides the basic signal to generate a first clock signal having a certain target frequency. When the second division ratio is set to the frequency divider circuit, the frequency divider circuit divides the basic signal to generate a second clock signal having a lower frequency than the target frequency. The counter circuit counts the number of pulses of the basic signal for a predetermined period of time. The calculation means calculates the first division ratio based on the counted number of pulses so that the first clock signal can have the target frequency regardless of the counted number of pulses. The selection means selects one of the first division ratio and the second division ratio based on the counted number of pulses. The setting means sets the selected one of the first division ratio and the second division ratio in the frequency divider circuit.

As a temperature of the ring oscillator increases, a frequency of the basic signal outputted from the ring oscillator decreases. This relationship between the temperature of the ring oscillator and the frequency of the basic signal varies very little with time. Therefore, the temperature of the ring oscillator can be accurately detected by monitoring the frequency of the basic signal outputted from the ring oscillator.

In the clock generator, the counter circuit counts the number of pulses of the basic signal to monitor the frequency of the basic signal. The frequency division ratio of the frequency divider circuit is changed according to the counted number of pulses. In such an approach, the clock generator detects the temperature of the ring oscillator without a temperature sensor and changes a frequency of a clock signal based on the detected temperature to prevent the ring oscillator from overheating. Specifically, when the temperature of the ring oscillator increases and the counted number of pulses of the basic signal decreases, the clock generator generates the second clock signal having the lower frequency than the target frequency. In such an approach, when the temperature of the ring oscillator increases, the frequency of the clock signal can be reduced without using the temperature sensor.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
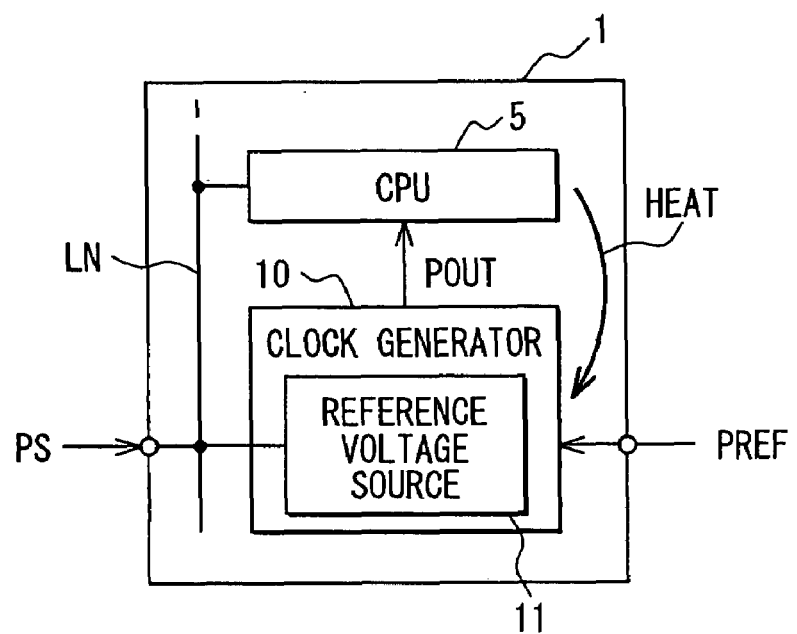
FIG. 1 is a block diagram of a semiconductor device having a clock generator according to an embodiment of the present invention.

As shown in FIG. 1, a central processing unit (CPU) 5 and a clock generator 10 according to an embodiment of the present invention are packaged in a semiconductor device 1. The CPU 5 and the clock generator 10 are connected to a power supply line LN, which is connected to a power supply (PS) via a power supply terminal of the semiconductor device 1. In a normal condition, the clock generator 10 generates and supplies a clock signal POUT having a certain target frequency for the CPU 5, and the CPU 5 operates synchronously with the clock signal POUT. The clock generator 10 is arranged near the CPU 5 in the semiconductor device 1. Therefore, heat produced by the CPU may be transferred to the clock generator 10. The clock generator 10 has a function to temporarily reduce a frequency of the clock signal POUT supplied to the CPU 5. Thus, the heat produced by the CPU 5 is reduced so that the clock generator 10 can be prevented from being operated under high temperature conditions.

Figure 2:
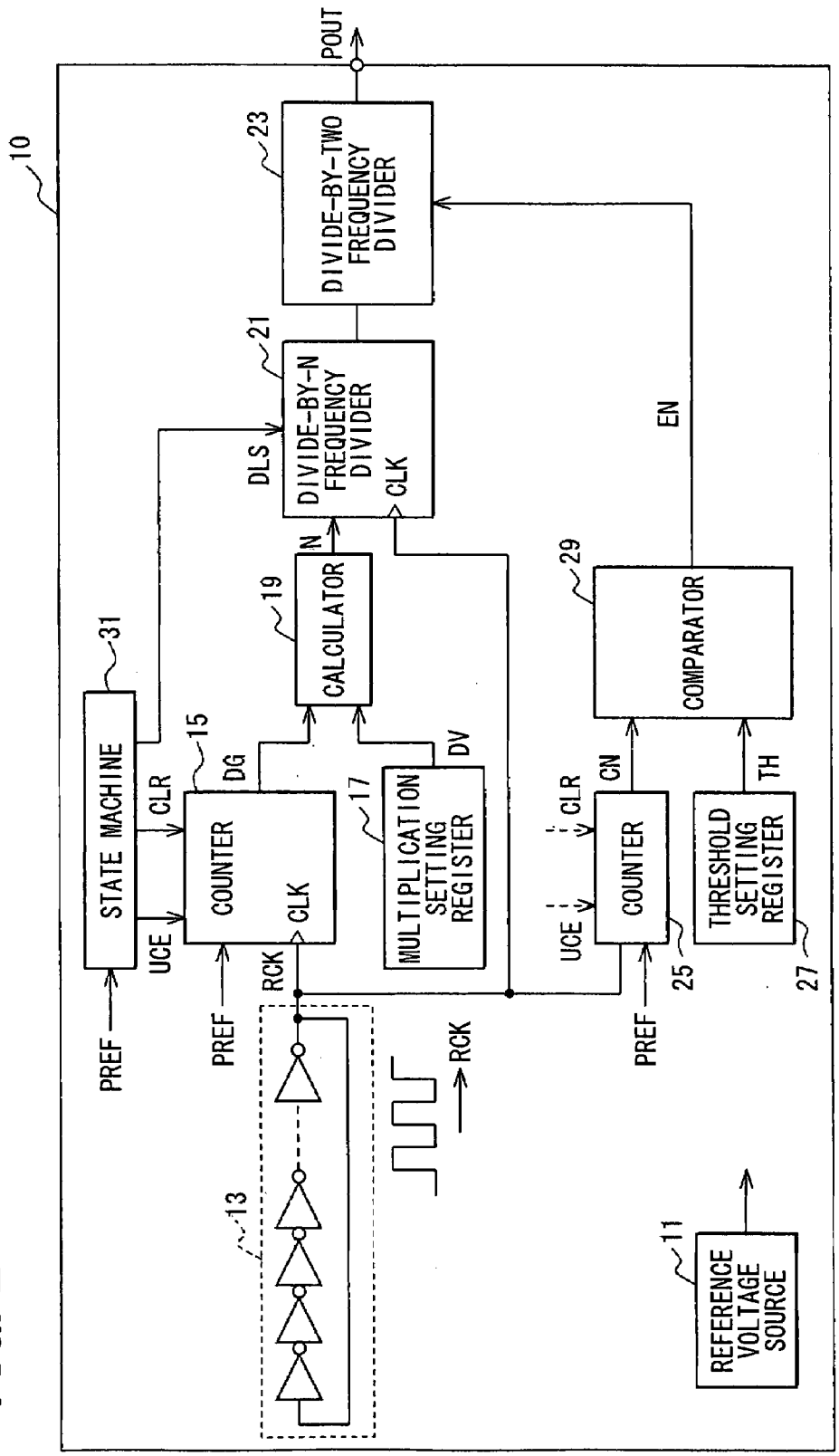
FIG. 2 is a block diagram of the clock generator.

As shown in detail in FIG. 2, the clock generator 10 includes a reference voltage source 11, a ring oscillator 13, a first counter circuit 15, a frequency multiplication setting register 17, a calculator 19, a divide-by-N frequency divider 21, a divide-by-two frequency divider 23, a second counter circuit 25, a threshold setting register 27, a comparator 29, and a state machine 31.

The clock generator 10 operates synchronously with a reference clock signal PREF supplied from an external oscillator (not shown).

The reference voltage source 11 generates a stable constant voltage from an electric power supplied via the power supply line LN shown in FIG. 1. The reference voltage source 11 feeds the constant voltage to internal circuits (e.g., the ring oscillator 13) of the clock generator 10. A large change in current in the CPU 5 may cause a change in voltage in the power supply line LN. The reference voltage source 11 allows the ring oscillator 13 to be fed with the constant voltage, regardless of the voltage change in the power supply line LN.

The ring oscillator 13 includes an odd number of inverters (i.e., NOT gates) connected in a circular chain. An output of the ring oscillator 13 is connected to the first counter circuit 15, the divide-by-N frequency divider 21, and the second counter circuit 25. The ring oscillator 13 outputs a basic signal RCK from one of the inverters to the first counter circuit 15, the divide-by-N frequency divider 21, and the second counter circuit 25. Since the ring oscillator 13 can be fed with the constant voltage, a frequency F0 of the basic signal RCK can be kept constant regardless of the voltage change in the power supply line LN.

Figure 3:
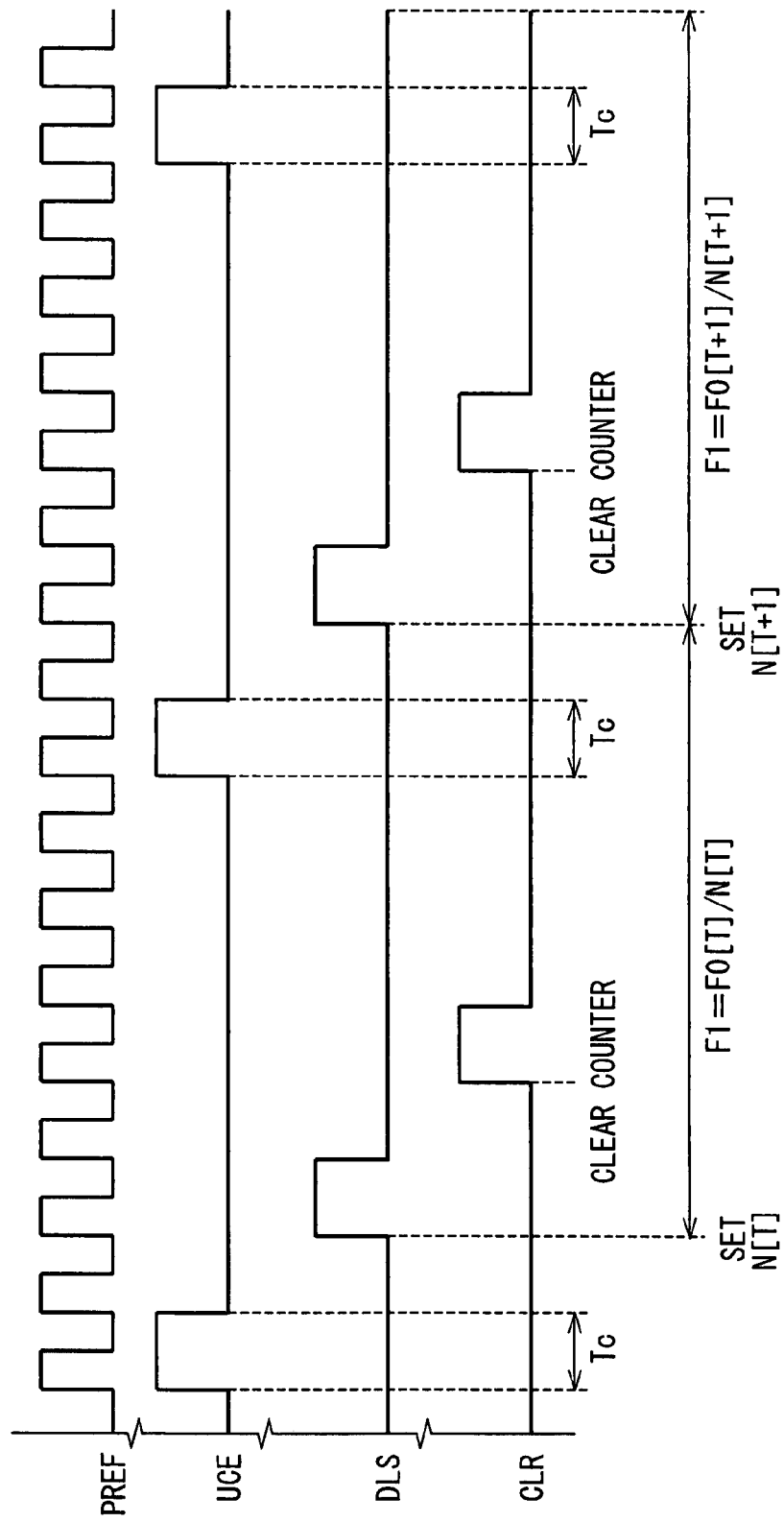
FIG. 3 is a timing chart of the clock generator.

The first counter circuit 15 receives the reference clock signal PREF from the external oscillator and a first control signal UCE from the state machine 31. While the first control signal UCE is on, the first counter circuit 15 counts the number of pulses of the basic signal RCK for one period Tc of the reference clock signal PREF. In this embodiment, as shown in FIG. 3, the first control signal UCE is turned on once every eight period (i.e. 8Tc) of the reference clock signal PREF so that the first counter circuit 15 counts the number of pulses of the basic signal RCK once every eight period of the reference clock signal PREF. When the first control signal UCE is turned off, a first count value DG indicative of the number of pulses counted by the first counter circuit 15 is outputted to the calculator 19.

The frequency multiplication setting register 17 stores a frequency multiplication ratio DV. The frequency multiplication ratio DV is calculated by dividing a target frequency F1 of the clock signal POUT by a reference frequency FREF of the reference clock signal PREF.

The calculator 19 calculates a frequency division ratio N and sets the frequency division ratio N to the divide-by-N frequency divider 21. The divide-by-N frequency divider 21 divides the basic signal RCK by the frequency division ratio N to generate a first clock signal having a first frequency F1 equal to the target frequency of the clock signal POUT.

Figure 4:
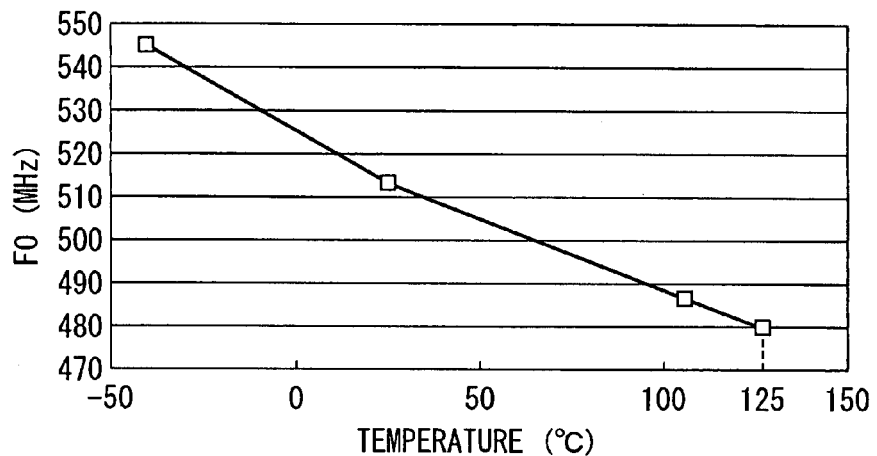
FIG. 4 is a graph showing a relationship between a temperature of a ring oscillator in the clock generator and a frequency of a basic signal outputted from the ring oscillator.

As shown in FIG. 4, the frequency F0 of the basic signal RCK of the ring oscillator 13 decreases with an increase in temperature of the ring oscillator 13. In short, the frequency F0 of the basic signal RCK of the ring oscillator 13 has a dependence on temperature of the ring oscillator 13. Therefore, the temperature of the ring oscillator 13 can be estimated based on the frequency F0 of the basic signal RCK.

The calculator 19 adjusts the frequency division ratio N according to the frequency F0 of the basic signal RCK. Thus, the first frequency F1 of the first clock signal generated by the divide-by-N frequency divider 21 becomes equal to the target frequency of the clock signal POUT, regardless of the temperature dependence of the frequency F0 of the basic signal RCK.

Specifically, the calculator 19 receives the first count value DG from the first counter circuit 15 and also receives the frequency multiplication ratio DV from the frequency multiplication setting register 17. The calculator 19 calculates the frequency division ratio N by dividing the first count value DG by the frequency multiplication ratio DV. Therefore, the frequency division ratio N is given as follows: N=DG/DV.

In such an approach, the first frequency F1 of the first clock signal becomes equal to the target frequency, even when the frequency F0 of the basic signal RCK varies with the temperature of the ring oscillator 13. In short, the first frequency F1 of the first clock signal has no dependence on the temperature of the ring oscillator 13.

The divide-by-N frequency divider 21 receives the frequency division ratio N from the calculator 19 and also receives a second control signal DLS from the state machine 31. When the second control signal DLS is tuned on, the divide-by-N frequency divider 21 fetches the frequency division ratio N so that the frequency division ratio N is set to the divide-by-N frequency divider 21. Thus, the second control signal DLS determines when to change the frequency division ratio N of the divide-by-N frequency divider 21. In this embodiment, as shown in FIG. 4, the second control signal DLS is turned on once every eight period of the reference clock signal PREF so that the frequency division ratio N of the divide-by-N frequency divider 21 is changed once every eight period of the reference clock signal PREF. The divide-by-N frequency divider 21 divides the basic signal RCK having the frequency F0 by the frequency division ratio N and outputs the first clock signal having the first frequency F1 to the divide-by-two frequency divider 23. Therefore, the first frequency F1 is given as follows: F1=F0/N.

The divide-by-two frequency divider 23 receives the first clock signal from the divide-by-N frequency divider 21 and also receives an enable signal EN from the comparator 29. While the enable signal EN is on, the divide-by-two frequency divider 23 acts to divide the first clock signal by two and outputs a second clock signal having a second frequency equal to half the first frequency F1, i.e., the target frequency. Thus, while the enable signal EN is on, the frequency of the clock signal POUT supplied to the CPU 5 is reduced to half the target frequency. In contrast, while the enable signal EN is off, the divide-by-two frequency divider 23 does not act to divide the first clock signal. Thus, while the enable signal EN is off, the frequency of the clock signal POUT supplied to the CPU 5 becomes equal to the first clock frequency F1, i.e., the target frequency.

The second counter circuit 25 operates in a similar manner as the first counter circuit 15. Specifically, the second counter circuit 25 receives the reference clock signal PREF from the external oscillator and also receives the first control signal UCE from the state machine 31. While the first control signal UCE is on, the second counter circuit 25 counts the number of pulses of the basic signal RCK for one period Tc of the reference clock signal PREF. In this embodiment, as shown in FIG. 3, the first control signal UCE is turned on once every eight period (i.e., 8Tc) of the reference clock signal PREF so that the second counter circuit 25 counts the number of pulses of the basic signal RCK once every eight period of the reference clock signal PREF. When the first control signal UCE is turned off, a second count value CN indicative of the number of pulses counted by the second counter circuit 25 is outputted to the comparator 29.

The threshold setting register 27 stores a threshold value TH. The threshold value TH corresponds to the second count value CN that is outputted from the second counter circuit 25 when the ring oscillator 13 is operated at an upper limit of a guaranteed operating temperature of the ring oscillator 13. The threshold value TH is calculated by dividing the frequency F0 of the basic signal RCK, which is outputted from the ring oscillator 13 when the ring oscillator 13 is operated at the upper limit, by the reference frequency FREF of the reference clock signal PREF. In this embodiment, as shown in FIG. 4, the upper limit of the guaranteed operating temperature of the ring oscillator 13 is 125 degrees Celsius (° C.). The frequency F0 of the basic signal RCK is 480 megahertz (MHz), when the ring oscillator 13 is operated at the upper limit of 125° C. Therefore, the threshold value TH is given as follows: TH=480 MHz/FREF.

Figure 5:
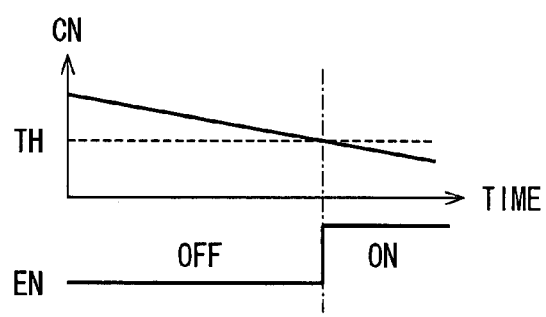
FIG. 5 is a timing chart of a comparator in the clock generator.

The comparator 29 compares the second count value CN with the threshold value TH and turns on the enable signal EN fed to the divide-by-two frequency divider 23 based on a result of the comparison. Specifically, as shown in FIG. 5, if the second count value CN is less than the threshold value TH, the comparator 29 turns on the enable signal EN so that the divide-by-two frequency divider 23 acts to divide the first clock signal by two. As a result, the clock signal POUT outputted from the clock generator 10 to the CPU 5 has the frequency equal to half the target frequency. In contrast, if the second count value CN is equal to or greater than the threshold value TH, the comparator 29 turns off the enable signal EN so that the divide-by-two frequency divider 23 does not act to divide the first clock signal. As a result, the clock signal POUT outputted from the clock generator 10 to the CPU 5 has the frequency equal to the target frequency.

The state machine 31 outputs the first control signal UCE to each of the first counter circuit 15 and the second counter circuit 25. Also, the state machine 31 outputs the second control signal DLS to the divide-by-N frequency divider 21.

As shown in FIG. 3, the second control signal DLS is tuned on two periods of the output signal PREF later than the first control signal UCE. Therefore, the first counter circuit 15 operates in response to the first control signal UCE, before the divide-by-N frequency divider 21 operates in response to the second control signal DLS. Thus, the frequency division ratio N of the divide-by-N frequency divider 21 can be suitably changed. Both the first count value DG of the first counter circuit 15 and the second count value CN of the second counter circuit 25 are cleared to zero by a third control signal CLR outputted from the state machine 31, after the frequency division ratio N is changed and before next period Tc comes.

Thus, the comparator 29 determines whether the temperature of the ring oscillator 13 reaches the upper limit of the guaranteed operating temperature of the ring oscillator 13 based on the second count value CN of the second counter circuit 25.

If the second count value CN is equal to or greater than the threshold value TH, the comparator 29 determines that the temperature of the ring oscillator 13 is equal to or less than the upper limit of the guaranteed operating temperature of the ring oscillator 13. Therefore, the comparator 29 determines that there is no need to reduce the frequency of the clock signal POUT and prevents the divide-by-two frequency divider 23 from dividing the first clock signal outputted from the divide-by-N frequency divider 21.

In contrast, if the second count value CN is less than the threshold value TH, the comparator 29 determines that the temperature of the ring oscillator 13 is greater than the upper limit of the guaranteed operating temperature of the ring oscillator 13. Therefore, the comparator 29 determines that there is a need to reduce the frequency of the clock signal POUT and allows the divide-by-two frequency divider 23 to divide the first clock signal outputted from the divide-by-N frequency divider 21.

In such an approach, the CPU 5 operates at a lower speed so that the heat produced by the CPU 5 can be reduced. Accordingly, the heat transferred to the clock generator 10 is reduced so that the temperature of the ring oscillator 13 can be kept less than the upper limit of the guaranteed operating temperature of the ring oscillator 13.

In the clock generator 10 according to this embodiment, the temperature of the ring oscillator 13 is estimated based on the second clock value CN of the second counter circuit 25. The frequency of the clock signal POUT supplied to the CPU 5 is changed according to the estimated temperature. Thus, without using a temperature sensor for detecting the temperature of the ring oscillator 13, the frequency of the clock signal POUT can be efficiently reduced to prevent the ring oscillator 13 from overheating. Therefore, the clock generator 10 has an increased durability and can be manufactured at lower cost by using the ring oscillator 13. Further, the reduction in processing speed of the CPU 5 can be minimized, because the frequency of the clock signal POUT is efficiently reduced according to the estimated temperature.

MODIFICATIONS

The embodiment described above may be modified in various ways. For example, the divide-by-two frequency divider 23 may have other division ratio than two. The divide-by-two frequency divider 23 may be provided between the ring oscillator 13 and the divide-by-N frequency divider 21. Alternatively, when the enable signal EN is turned on, the divide-by-two frequency divider 23 may instruct the calculator 19 to calculate a frequency division ratio twice the frequency division ratio N. In such an approach, the first frequency F1 of the first clock signal outputted from the divide-by-N frequency divider 21 becomes half the target frequency of the clock signal POUT.

Such changes and modifications are to be understood as being within the scope of the present invention as defined by the appended claims.

What is claimed is:

1. A clock generator comprising
a ring oscillator including an odd number of inverter gates connected in a circular chain and for outputting a basic signal from one of the inverter gates;
a frequency divider circuit for dividing the basic signal by one of a first division ratio and a second division ratio, the first division ratio allowing the frequency divider circuit to generate a first clock signal having a target frequency, the second division ratio allowing the frequency divider circuit to generate a second clock signal having a different frequency than the target frequency;
a first counter circuit for counting the number of pulses of the basic signal for a first predetermined period of time, the first counter circuit outputting a first count value indicative of the number of pulses counted for the first predetermined period of time;
a second counter circuit for counting the number of pulses of the basic signal for a second predetermined period of time, the second counter circuit outputting a second count value indicative of the number of pulses counted for the second predetermined period of time;
a calculator for calculating the first division ratio based on the first count value outputted from the first counter circuit; and
a setting circuit for selecting one of the first division ratio and the second division ratio based on a temperature of the ring oscillator, the temperature being estimated from the second count value outputted from the second counter circuit,
the setting circuit setting the selected one of the first division ratio and the second division ratio in the frequency divider circuit.

2. The clock generator according to claim 1, wherein
the setting circuit selects the first division ratio when the second count value is equal to or greater than a predetermine threshold value, the setting circuit selecting the second division ratio when the second count value is less than the predetermine threshold value, and
the different frequency of the second clock signal is less than the target frequency of the first clock signal.

3. The clock generator according to claim 1,
wherein the calculating circuit calculates the first division ratio by dividing the first count value by a frequency multiplication ratio.

4. The clock generator according to claim 3, further comprising:
a multiplication setting register for storing the frequency multiplication ratio.

5. The clock generator according to claim 3,
wherein the frequency multiplication ratio is calculated by dividing a target frequency of the default clock signal by a reference frequency of a reference clock.

6. The clock generator according to claim 1,
wherein the different frequency of the second clock signal is half of the target frequency of the first clock signal.

7. A clock generator comprising:
a ring oscillator including an odd number of inverter gates connected in a circular chain and for outputting a basic signal from one of the inverter gates;
a frequency divider circuit for generating a clock signal by dividing the basic signal by a predetermined division ratio;
a counter circuit for counting the number of pulses of the basic signal for a predetermined period of time;
estimation means for estimating a temperature of the ring oscillator based on the counted number of pulses of the basic signal; and
changing means for changing the division ratio of the frequency divider circuit based on the estimated temperature,
wherein the changing means increases the division ratio when the estimated temperature rises above a temperature threshold.

8. A clock generator comprising:
a ring oscillator including an odd number of inverter gates connected in a circular chain and for outputting a basic signal from one of the inverter gates;
a frequency divider circuit for generating a clock signal by dividing the basic signal by a predetermined division ratio;
a counter circuit for counting the number of pulses of the basic signal for a predetermined period of time;
estimation means for estimating a temperature of the ring oscillator based on the counted number of pulses of the basic signal;
changing means for changing the division ratio of the frequency divider circuit based on the estimated temperature; and
a second counter circuit for counting a second number of pulses of the basic signal for a second period of time,
wherein the predetermined division ratio is generated based on the second number of pulses.

9. The clock generator according to claim 8,
wherein the predetermined ratio is determined by dividing the second number of pulses by a frequency multiplication ratio, and
wherein the frequency multiplication ratio is calculated by dividing a target frequency of the clock signal by a reference frequency of a reference clock.

10. A clock generator comprising:
a ring oscillator configured to output a basic signal, the ring oscillator including an odd number of inverter gates connected in a circular chain;
a clock generator circuit configured to generate a default clock signal by dividing the basic signal by a first division ratio, and to generate a reduced clock signal by dividing the basic signal by a second division ratio, wherein the clock generator circuit outputs the default clock when a control signal has a first value and outputs the reduced clock when the control signal has a second value;
a first counter circuit configured to count a first number of pulses of the basic signal for a first predetermined period of time to generate a temperature estimation value; and
a changing circuit configured to generate the control signal based on the temperature estimation value,
a second counter circuit configured to count a second number of pulses of the basic signal for a second predetermined period of time to generate a count value; and
a calculation circuit configured to divide the count value by a frequency multiplication ratio to generate the first division ratio.

11. The clock generator according to claim 10,
wherein the clock generator circuit comprises:

a first frequency divider configured to divide the basic signal by the first division ratio to generate the default clock signal; and a second frequency divider configured to divide the default clock by a third division ratio to generate the reduced clock signal, wherein the third division ratio is greater than 1, and wherein the second division ratio is equal to the first division ratio times the third division ratio.

12. The clock generator according to claim 11, wherein the third division ratio is 2.

13. The clock generator according to claim 10, wherein the frequency multiplication ratio is calculated by dividing a target frequency of the default clock signal by a reference frequency of a reference clock.

14. The clock generator according to claim 10, further comprising:

a frequency multiplication register configure to store the frequency multiplication ratio.

15. A clock generator comprising:

a ring oscillator configured to output a basic signal, the ring oscillator including an odd number of inverter gates connected in a circular chain;

a clock generator circuit configured to generate a default clock signal by dividing the basic signal by a first division ratio, and to generate a reduced clock signal by dividing the basic signal by a second division ratio, wherein the clock generator circuit outputs the default clock when a control signal has a first value and outputs the reduced clock when the control signal has a second value;

a first counter circuit configured to count a first number of pulses of the basic signal for a first predetermined period of time to generate a temperature estimation value; and a changing circuit configured to generate the control signal based on the temperature estimation value, wherein the changing circuit is configured to compare the temperature estimation value to a threshold value, wherein when the temperature estimation value is lower than the threshold value, the changing circuit sets the control signal to the first value, and wherein when the temperature estimation value is higher than the threshold value, the changing circuit sets the control signal to the second value.

16. The clock generator according to claim 15, further comprising:

a threshold register configure to store the threshold value.

17. The clock generator according to claim 15, wherein the first division ratio is periodically updated.

* * * * *